United States Patent
Gambale et al.

[15] 3,685,218
[45] Aug. 22, 1972

[54] GLASS POLISHING COMPOSITIONS BASED ON ZIRCON AND/OR ZIRCONIA AND ZIRCONIUM FLUOSULFATE AND POLISHING PROCESS USING THE SAME

[72] Inventors: James Richard Gambale, Amity Gardens, Douglassville, Pa. 19518; Henry Asaph Stone, III, Box 387 Long Hills Rd., Neshanic Station, N.J. 08853

[22] Filed: Dec. 8, 1970

[21] Appl. No.: 96,244

[52] U.S. Cl. .....................51/283, 51/308, 51/309, 106/3
[51] Int. Cl. ..............................................B24b 1/00
[58] Field of Search........51/307, 308, 309, 283, 281, 51/284; 106/3

[56] References Cited

UNITED STATES PATENTS

| | | | |
|---|---|---|---|
| 3,429,080 | 2/1969 | Lachapelle | 51/307 |
| 3,388,980 | 6/1968 | Foster | 51/307 |
| 3,388,981 | 6/1968 | Sieger | 51/307 |
| 3,388,508 | 6/1968 | Sieger et al. | 51/307 |
| 3,576,750 | 4/1971 | Muhler | 51/308 |

Primary Examiner—Donald J. Arnold
Attorney—Janes & Chapman

[57] ABSTRACT

Synergistic glass polishing compositions are provided comprising zirconium oxide and/or zirconium silicate as the polishing oxides, and a zirconium fluosulfate as an additive enhancing the polishing action of the oxide and/or silicate.

A process also is provided for polishing glass with a felt applicator using a glass polishing composition comprising zirconium oxide and/or zirconium silicate and a zirconium fluosulfate, at a pH with the range from about 3.5 to about 14.

14 Claims, No Drawings

GLASS POLISHING COMPOSITIONS BASED ON ZIRCON AND/OR ZIRCONIA AND ZIRCONIUM FLUOSULFATE AND POLISHING PROCESS USING THE SAME

In recent years, cerium and zirconium oxides have become well established as glass polishes. These substances are finely ground, and slurried in a liquid, usually water; the mix is then used to polish the rough glass surface. The form of zirconium oxide can be either cubic or monoclinic. Pricewise, zirconium oxide is less expensive than cerium oxide, and since it is as effective under some conditions, it has a competitive advantage in such circumstances. Zirconium silicate is a fairly slow polishing agent, compared to these, but it is far less expensive, and therefore in some commercial uses it could command a portion of the market, because of price, if its polishing effectiveness could be brought up to the standard of the more expensive zirconium and cerium oxides, to get equivalent results.

The polishing effectiveness of zirconium oxide can be enhanced by combination with various additives. U. S. Pat. No. 3,123,452 dated Mar. 3, 1964, discloses that the polishing action of zirconium oxide, zirconium silicate, and cerium oxide can be considerably improved by incorporating therewith a small acount of a hydroxide, carbonate, or other salt of zirconium. The polishing action can by this means be increased by as much as 76 percent. The salts of zirconium that can be used in these compositions are salts that form zirconium hydroxide in aqueous solution, and as typical of such hydroxide salts are named the sulfates, nitrates, oxychlorides and acetates of zirconium. An alkali such as sodium or potassium hydroxide may be added to the salts to form the hydroxide before polishing is started. However, the hydroxide is of course formed in alkaline solution, and since the polishing composition gradually becomes alkaline as polishing continues, conversion of the acidic or neutral zirconium salts to the corresponding hydroxide also occurs readily in the course of polishing, so that it is unnecessary to add alkali at the start of the polishing operation, except to obtain an initial advantage.

In accordance with the instant invention, polishing compositions are provided based on zirconium oxide and/or zirconium silicate, alone or in admixture, with a zirconium fluosulfate in an amount to enhance the polishing action of the zirconium oxide and/or zirconium silicate. When the zirconium oxide and zirconium silicate are used in combination, the enhanced polishing action is very noticeable, and is indicative of a synergistic effect. The zirconium fluosulfate also enhances the polishing action of the zirconium oxides alone, and of the zirconium silicate alone, but to a lesser extent. It does not enhance the polishing action of cerium oxide. The effect is therefore rather specific.

This effect is particularly surprising, inasmuch as zirconium fluosulfate is not a polishing compound, and when used alone, displays no polishing action whatsoever.

The enhanced polishing effectiveness is noted when a felt applicator, such as a polishing pad, is employed.

A further feature of the polishing compositions of the invention is that the enhanced polishing effect is noted best while the pH of the composition is on the acid side, within the range from about 5 to about 7. After the composition becomes alkaline, beyond pH 7, or more acid, below pH 3.5, the enhanced polishing effect diminishes.

Accordingly, in the process of the instant invention, glass is polished with a felt pad by an aqueous slurry comprising zirconium oxide and/or zirconium silicate, alone or in admixture, and a zirconium fluosulfate in an amount to enhance the polishing effectiveness of the zirconium oxide and zirconium silicate at a pH within the range from about 3.5 to about 14, preferably 5 to 7.

The enhanced polishing effectiveness noted in accordance with the invention is measured by the amount of glass removed in a stated period of time. The polishing composition to be evaluated is mixed with water, and a weighed glass disc polished under standardized conditions. The amount of glass removed is determined by the loss in weight of the glass disc in mg. The weight loss per unit time is the figure of merit in polishing efficiency.

The zirconium oxide and zirconium silicate used are known polishing compounds. Zirconium oxide is available in many grades and forms, such as the Lustrox types. Zirconium silicate is also available, as zircon sand or zircon flour.

The crystal form of the zirconium oxide and zirconium silicate is not critical. Both monoclinic and cubic zirconium oxides can be used.

The particle size of the polishing compounds and zirconium fluosulfate is not critical either. However, a finely divided form, less than 20 microns and preferably less than 5 microns, is desirable.

A particular advantage of the polishing compositions of the invention, when zirconium silicate is used, is their low cost. The zirconium silicate can be provided in the form of zircon, which is commercially available as zircon sand. It is not necessary to employ a zircon ore of high purity; however, a finely divided form is necessary to accomplish the desired results. The zircon serves as as a diluent for zirconium oxide, and much less zirconium oxide is needed, per unit weight of polishing composition, in the compositions of the invention than in compositions where all of the polishing oxide is zirconium oxide. The zirconium fluosulfate enhances the polishing effectiveness of both, and thus also serves as an extender.

The relative proportions of zirconium oxide and zirconium silicate can be varied as desired, from 0 to 100 percent zirconium oxide, and from 100 to 0 percent zirconium silicate. An enhanced synergism is observed at amounts from 25 to 75 percent zirconium oxide and from 75 to 25 percent zirconium silicate. From the standpoint of economics, compositions containing from 50 to 75 percent zirconium silicate and from 25 to 50 percent zirconium oxide are preferred. These amounts are by weight of the polishing compounds.

The enhanced polishing effect is specific, so far as is now known, to zirconium fluosulfate. Zirconium sulfate without the fluorine does not display the effect, so that fluoride ion is definitely required. The chemistry of zirconium fluosulfate is quite complex and not fully elucidated. It may not exist as such, but may be a zirconium sulfate with fluoride loosely held to the molecule in some way. The fluosulfate can be an acid fluosulfate, or a basic fluosulfate. The proportion of fluoride ion to zirconium need not be stoichiometric.

Compounds or compositions having a molar ratio $F:ZrO_2$ within the range from about 0.1:1 to about 2:1 and a molar ratio $SO_4:ZrO_2$ within the range from about 0.1:1 to about 2:1 are effective. Moreover, it is not necessary to add zirconium fluosulfate as such to the polishing composition. The same effect can be obtained by adding a mixture of zirconium fluoride and zirconium sulfate, or by adding a source of fluoride, such as hydrogen fluoride, sodium fluoride, ammonium fluoride, or calcium fluoride, and zirconium sulfate.

Since the pH of a polishing slurry for glass tends in use to increase and become more alkaline as the polishing continues, probably because of the removal of alkaline material from the glass which dissolves in the polishing composition, the polishing effectiveness of the compositions of the invention tends to diminish with use, as the pH becomes more alkaline. Consequently, it may be desirable to add an acid such as acetic acid to the polishing slurry, to assist in maintaining a pH on the acid side, i.e., below pH 7.

The amount of the zirconium fluosulfate is not critical. As little as 0.25 percent will considerably improve the polishing effectiveness of the zirconium oxide and/or zirconium silicate. The upper limit of the amount is the point at which polishing efficiency of the oxide and/or silicate begins to be impaired, an effect probably due to the lack of polishing effectiveness of the zirconium fluosulfate, when used alone. This limit usually is not reached until the composition contains more than 60 percent zirconium fluosulfate. Preferably, from 10 to 35 percent zirconium fluosulfate is employed. These amounts are based on the weight of the polishing compounds, taken together.

The glass polishing composition is readily prepared by mixing the zirconium oxide and/or zirconium silicate with the zirconium fluosulfate and with water to form a suspension, which is then applied to the glass in the conventional way, in a felt pad-equipped glass polishing apparatus.

The polishing is carried out at room temperature by applying the composition to the glass, and then polishing and then polishing with a felt polishing pad or other type of felt polishing means. The standard commercial bowl polisher is quite satisfactory. The felt is a fibrous mat in which the fibers can be of natural fibrous material, such as wool, mohair, angora, vicuna, or cotton, or synthetic fibrous material such as nylon, polyvinyl chloride, polyester, polyacrylonitrile, or polyvinlidene chloride. If desired, water can be added from time to time to compensate for evaporation loss and maintain a constant concentration, but this is not essential.

The following examples in the opinion of the inventor represent preferred embodiments of this invention.

A standardized polishing test was used to evaluate polishing efficiency in the Examples, carried out as follows:

The amount of polishing composition to be evaluated was thoroughly mixed in 150 ml. of water, and a weighed glass disc was then polished for 10 minutes, using a standard commercial wool felt pad on a bowl polisher. At the end of 10 minutes, the glass disc was examined for quality of polish and weighed, the weight loss in mg. being reported as the polishing efficiency.

EXAMPLES 1 to 4

A mixture was prepared composed of 50 parts zirconium silicate (5 micron size), 15 parts zirconium oxide (cubic, 0.5 micron) and 35 parts basic zirconium fluosulfate cake was blended with water to form a slurry containing 50 percent solids, and this slurry was milled for 4 hours and then adjusted to a pH of 5.5 by addition of sodium hydroxide. The resulting slurry was then used to polish glass of the type used on TV face plates, using a thick wool felt pad on a bowl polisher.

Comparison runs were carried out using cerium oxide alone, zirconium oxide alone, zirconium silicate alone and zirconium fluosulfate alone. The following results were obtained.

| Example No. | Polishing compound | Removal rates[1] mg. of glass per 10 minutes |
|---|---|---|
| Control A | Cerium oxide Commercial Product 1 | 143 |
| Control B | Cerium oxide Commercial Product 2 | 177 |
| Control C | Zirconium silicate | 80 |
| Control D | Zirconium oxide (cubic) | 117 |
| Control E | Zirconium fluosulfate | 0 |
| Example 1 | Zirconium silicate 70% Zirconium fluosulfate 30% | 148 |
| Example 2 | Zirconium oxide 15% Zirconium silicate 50% Zirconium fluosulfate 35% | 178 |

[1] Figures±5 mg.

Example 1 shows that the zirconium fluosulfate is effective in enhancing the polishing action of the zirconium silicate, compared with Control C. The polishing action is even superior to zirconium oxide, as shown by Control D.

It is evident from Example 2 that in a mixture of zirconium oxide and zirconium silicate with zirconium fluosulfate, the polishing effectiveness is further enhanced, as compared to Example 1. These polishing compositions, although they contain much less zirconium oxide, are far more effective than zirconium oxide alone (Control D) or zirconium silicate alone (Control C), or even cerium oxide alone, Controls A and B.

The zirconium fluosulfate alone was ineffective, as shown by Control E.

Having regard to the foregoing disclosure, the following is claimed as the inventive and patentable embodiments thereof:

1. A glass polishing composition consisting essentially of at least one polishing compound selected from the group consisting of zirconium oxide, zirconium silicate and mixtures thereof and a zirconium fluosulfate in an amount within the range from about 0.25 percent to about 60 percent by weight of the polishing compound to increase the polishing effectiveness of the polishing compound, the composition having a pH in the presence of water within the range from about 3.5 to about 14.

2. A glass polishing composition in accordance with claim 1, in which the polishing compound is zirconium oxide.

3. A glass polishing composition in accordance with claim 1, in which the polishing compound is zirconium silicate.

4. A glass polishing composition in accordance with claim 1, in which the polishing compound is a mixture of zirconium oxide and zirconium silicate.

5. A glass polishing composition in accordance with claim 4, in which the amount of zirconium oxide is within the range from about 25 to about 75 percent, and the amount of zirconium silicate is within the range from about 75 to 25 percent, by weight of the polishing compound.

6. A glass polishing composition in accordance with claim 1, in which the zirconium fluosulfate is a basic zirconium fluosulfate.

7. A glass polishing composition in accordance with claim 1, in which the amount of zirconium fluosulfate is within the range from about 10 to about 35 percent by weight of the polishing compound.

8. A glass polishing composition in accordance with claim 1, having a pH within the range from about 3.5 to about 7.

9. A glass polishing composition in accordance with claim 1, having a pH within the range from about 5 to about 7.

10. A glass polishing composition in accordance with claim 1, including a buffering agent in an amount to maintain a pH within the stated range.

11. A glass polishing composition according to claim 1, in the form of an aqueous slurry having a pH within the range from about 3.5 to about 14 and containing from about 5 to about 60 percent by weight of the polishing compound.

12. A glass polishing composition according to claim 1, in which the particle size of the polishing compound and the zirconium fluosulfate is less than 20 microns.

13. A process for polishing glass, which comprises applying to the surface of the glass a composition consisting essentially of a slurry in water of a polishing composition according to claim 1, and polishing the glass therewith using a felt polishing applicator.

14. A process in accordance with claim 13, in which an acidic compound is added from time to time, to maintain pH within the stated range, and the composition is reused for successive glass articles.

* * * * *